US005592601A

United States Patent [19]
Kelley et al.

[11] Patent Number: 5,592,601
[45] Date of Patent: Jan. 7, 1997

[54] METHOD AND APPARATUS FOR INCREMENTAL ACCELERATION OF THE RENDERING PROCESS UTILIZING MULTIPLE SCANLINE RENDERING DEVICES

[75] Inventors: Michael W. Kelley, San Mateo; Shou-Chern Yen, Sunnyvale, both of Calif.

[73] Assignee: Apple Computer, Inc., Cupertino, Calif.

[21] Appl. No.: 316,233

[22] Filed: Sep. 30, 1994

Related U.S. Application Data

[63] Continuation-in-part of Ser. No. 232,831, Apr. 22, 1994.
[51] Int. Cl.[6] .................................................. G06F 15/00
[52] U.S. Cl. ............................................................ 395/143
[58] Field of Search ................................. 395/140, 141, 395/142, 143; 345/118, 135

[56] References Cited

U.S. PATENT DOCUMENTS

| | | | |
|---|---|---|---|
| 4,594,673 | 6/1986 | Holly | 364/522 |
| 4,658,247 | 4/1987 | Gharachorloo | 340/747 |
| 4,697,178 | 9/1987 | Heckel | 340/729 |
| 4,815,009 | 3/1989 | Blatin | 364/518 |
| 4,866,637 | 9/1989 | Gonzalez-Lopez et al. | 364/518 |
| 4,885,703 | 12/1989 | Deering | 364/522 |
| 4,897,803 | 1/1990 | Calarco et al. | 364/518 |
| 4,945,500 | 7/1990 | Deering | 364/522 |
| 5,001,651 | 3/1991 | Rehme et al. | 364/518 |
| 5,029,105 | 7/1991 | Coleman et al. | 364/518 |
| 5,115,402 | 5/1992 | Matsushiro et al. | 395/141 |
| 5,123,085 | 6/1992 | Wells et al. | 364/518 |
| 5,128,872 | 7/1992 | Malachowsky et al. | 395/162 |
| 5,157,388 | 10/1992 | Kohn | 340/800 |
| 5,214,753 | 5/1993 | Lee et al. | 395/125 |
| 5,222,204 | 6/1993 | Swanson | 395/127 |
| 5,226,147 | 7/1993 | Fujishima et al. | 395/425 |
| 5,249,264 | 9/1993 | Matsumoto | 395/134 |
| 5,253,335 | 10/1993 | Mochizuki et al. | 395/122 |
| 5,261,041 | 11/1993 | Susman | 395/152 |
| 5,268,995 | 12/1993 | Diefendorff et al. | 395/122 |
| 5,274,760 | 12/1993 | Schneider | 395/162 |
| 5,278,949 | 1/1994 | Thayer | 395/126 |
| 5,307,449 | 4/1994 | Kelley et al. | 395/119 |
| 5,392,385 | 2/1995 | Evangelisti et al. | 395/131 |
| 5,402,147 | 3/1995 | Chen et al. | 345/115 |

OTHER PUBLICATIONS

Kelley et al., "A Scalable Hardware Render Accelerator Using a Modified Scanline Algorithm", Computer Graphics, Jul., 1992, pp. 241–248.
J. D. Foley et al., "Second Edition Computer Graphics Principles and Practice," 1990, pp. 885, 886, 899, 900.
L. Williams, "Pyramidal Parameterics," Computer Graphics, vol. 17, No. 3, Jul. 1983, pp. 1–11.
H. Fuchs, "Pixel-Planes 5: A Heterogeneous Multiprocessor Graphics System Using Processor Enhanced Memories," Computer Graphics, vol. 23, No. 3, Jul. 1989, pp. 79–88.
Akeley, et al., "High-Performance Polygon Rendering," Computer Graphics, vol. 22, No. 4, Aug. 1988, pp. 239–246.
M. Oka et al., "Real-Time Manipulation of Texture-Mapped Surfaces," Computer Graphics, vol. 21, No. 4, Jul. 1987, pp. 181–188.
M. Deering, et al., "The Triangle Processor and Normal Vector Shader: A VLSI System for High Performance Graphics," Computer Graphics, vol. 22, No. 4, Aug. 1988, pp. 21–30.

(List continued on next page.)

*Primary Examiner*—Phu K. Nguyen
*Attorney, Agent, or Firm*—Blakely, Sokoloff, Taylor & Zafman

[57] ABSTRACT

A method for providing objects to a rendering circuit. The method comprises the steps of: generating an active list, the active including a first subset of the objects; accessing the first subset of objects from the first memory; storing the first subset of objects in a second memory, the second memory having a faster access time than the first memory, and providing the active list to the rendering circuit.

12 Claims, 11 Drawing Sheets

OTHER PUBLICATIONS

D. Kirk et al., "The Rendering Architecture of the DN 10000VS," Computer Graphics, vol. 24, No. 4, Aug. 1990, pp. 299–307.

Burgoon, Dave, "Pipelined Graphics Engine Speeds 3-D Image Control", *Electronic Design*, No. 17, Jul. 23, 1987, pp. 143–146, 148, 150.

Dowdell, Casey et al., "Scalable Graphics Enhancements for PA–RISC Workstations", Feb. 24–28, 1992 Spring COMPCON 92, Thirty–Seventh IEEE Computer Society International Conference, pp. 122–128.

Grimes, J., "The Intel i860 64–Bit Processor: A General–Purpose CPU with 3D Graphics Capabilities", IEEE Computer Graphics and Applications, Jul. 9, 1989, No. 4, pp. 85–94.

METHOD AND APPARATUS FOR INCREMENTAL ACCELERATION OF THE RENDERING PROCESS UTILIZING MULTIPLE SCANLINE RENDERING DEVICES

1. RELATED APPLICATIONS

This application is a continuation-in-part of U.S. application Ser. No. 08/232,831, filed Apr. 22, 1994, entitled "Method and Apparatus for Cacheing Objects."

BACKGROUND OF THE INVENTION

2. FIELD OF THE INVENTION

The present invention relates to the field of image display in a computer system. In particular, the present invention relates to the field of scanline rendering of objects to generate the image.

3. ART BACKGROUND

As the processing capability of computer systems has grown, the need for more complex and better graphical representation of images has also grown. Many vocations use computer system as a fundamental tool. For example, in the area of architectural design, three dimensional (3D) graphical images of building, or other structures, can be dynamically created and manipulated using computer systems. The computer system can capture, and process, the necessary image data much faster than can be done manually. As computer hardware technology advances, so has the development of various techniques for rapidly displaying, and manipulating, these images.

A 3D image is represented in a computer system as a collection of graphical objects. A computer system displays these objects on a display device (for example, a cathode ray tube (CRT)). All the objects are processed by the computer system, and some of them are displayed on the display device. The reason that only some of objects are displayed is that only some of the them can be seen from a given viewpoint. The computer decides which objects can be seen from a particular viewpoint using each object's depth parameters. In displaying hundreds, or thousands of objects, to make a single image, it is clear that the computer system performs an enormous number of calculations.

Computer graphics systems typically include a display control, and a display device. The display control often includes a frame buffer. The frame buffer is a digital memory for storing the image to be displayed as a series of binary values. The display device includes a screen having an array of picture elements, known as pixels. Each pixel represents a dot on the screen, and each pixel can be programmed to a particular color or intensity. Thousands of individual pixels, so programmed, are used to represent a displayed image. It is these individual pixel values which are stored in the frame buffer. A display controller reads the data from the frame buffer and converts it into a video signal. The video signal is fed to the monitor which displays the image.

Images are repeatedly rendered into the display over and over again, with each new frame representing a new position or shape of the image to be viewed. Rendered means creating a pixel representation of something. The image must be repeatedly sent to the monitor in order to maintain a steady picture on the screen. Due to characteristics of the human eye, the monitor needs to be refreshed at a minimum of 30 times a second. Otherwise, the display will flicker in a very annoying and distracting manner. In today's computer graphics systems, the refresh frequency is typically around 72 hertz (i.e., 72 times a second). A faster refresh rate produces less flicker. Hence, the duration for displaying an image is relatively small, approximately $^1\!/_{72}$ of a second or 14 milliseconds. Given these constraints, it is imperative to speed up the graphics drawing process to avoid sluggish response times and jerky movements of displayed images. Moreover, the faster an image can be drawn, the more information which can be provided to the display. This results in smoother, more dynamic, and crisper images.

FIG. 1a illustrates an object that can be displayed by a computer system. Typically, the objects are polygons, and typically, the polygons are triangles. In this example, triangle 101 has three vertices: vertex A 102; vertex B 103; and vertex C 104. For the purposes of illustration, a triangle is used throughout this description, however, it should be noted that any object capable of being represented on a computer display can be used.

One technique for displaying triangle 101 is called scanline rendering. A display comprises a number of scanlines. Each scanline is the width of a pixel on the display. Most computer displays have hundreds of scanlines and display hundreds of thousands of pixels. In scanline rendering, a computer display image is created one scanline at a time. Therefore, for each scanline, all the objects that have a portion to be displayed on that scanline are rendered. These objects are said to be active for that scanline.

FIG. 1b illustrates the triangle of FIG. 1a as it would be scanline displayed. Triangle 101 is mapped to the display scanlines 105–111. Thus, for each scanline 105–111, some pixels will be displayed that represent triangle 101. Triangle 101 is said to be active for scanlines 105–111. That is, for each of those scanlines, it must be determined if some portion of triangle 101 must be displayed. For example, a rendered scanline 108 includes pixels 109 representing a portion of triangle 101.

In this example, scanline 108 could include portions, or all, of other objects. Remember that only objects, that are not blocked by other objects, and are active for a particular scanline, will be rendered on that scanline. Therefore, there can be many active objects for a scanline, but only the objects that can be seen will be rendered for that scanline.

FIG. 2 is a flowchart illustrating a scanline method for rendering an image. At step 201, all the image's objects are sorted in order of their activation scanline. An activation scanline is the first scanline that an object. Scanlines are typically counted from 0, where 0 is the top scanline of the display. Thus, in the previous example, triangle 201's activation scanline will be scanline 105. The next step 202 is to build the active object list for the first scanline to be rendered. This active object list contains all the objects that are active for the first scanline. At step 203, the first scanline is rendered.

At step 204, if not all the scanlines have been rendered, then at step 205, the active object list is updated for the next scanline. That is, the first scanline's active objects, that are not active for the second scanline, are removed from the list; the objects not active for the first scanline, but that are active for the second scanline, are added to the list, and the objects that are active for both the first and second scanlines remain in the list. After updating the active object list, the next scanline is rendered at step 203. Steps 203–205 are repeated until all the scanlines for the display have been rendered.

Note, for simplicity throughout this description, each list can be thought of as comprising a set of zero or more objects. However, in practice, each list may only contain a reference to zero or more objects. One skilled in the art will understand when a list contains only references to objects, and when a list contains the objects themselves.

FIG. 3a illustrates an object activation list as used in step 201 of the scanline method of FIG. 2. In this image, triangle A 321, triangle B 322 and triangle C 323 make up an image to be displayed. Each triangle has an activation scanline. Triangle A, determined by vertex 326, has an activation scanline of 5. Triangle B, determined by vertex 324, has an activation scanline of 1. Triangle C, determined by vertex 325, has an activation scanline of 1. From these activation scanlines, the object activation list 329 can be generated. Thus, for the object activation list entry corresponding to scanline 0, no objects are listed. For the entry corresponding to scanline 1, B 322 and C 323 are listed, shown as entry 327. No objects are listed for entries 2–4. For the entry 328 corresponding to scanline 5, triangle A 321 is listed. No objects are listed for entries 6–8.

FIG. 3b illustrates the active object list status 340 for each scanline rendered from the FIG. 3a example. Note that only one active object list is kept at any one time. Active object list 340 merely indicates the state of the active object list for each scanline as that scanline is rendered. At step 202, the active object list for scanline 0 is generated. The active object list is empty for rendering scanline 0 because no objects are active on that scanline. Thus, at step 203, no objects will be rendered for scanline 0. At step 204, the computer system determines that more scanlines need be generated. At step 205, the active object list is updated to include both triangles B 322 and C 323, shown as 341. Scanline 1 is then rendered using the objects in the active object list (B 322 and C 323). Steps 203–205 are repeated for scanlines 2–4. Note that the active object list does not change during these steps as both B 322 and C 323 are active for scanlines 2–4.

At step 205, in preparation for scanline 5 generation, the active object list is different, shown as 342. C 323 is not active for scanline 5, and is therefore removed from the list. However, A 321 becomes active on scanline 5, and is therefore added to the list. Scanline 5 is then rendered with objects B 322 and A 321.

At step 205, in preparation for scanline 6 generation, the activation list is changed, shown as 343. B 322 is not active for scanline 6, and is therefore removed from the list. Note that A 321 is still active, and is therefore left in the active object list. Not until the preparation of scanline 9, is A 321 removed from the active object list.

Thus, all the objects representing a computer image can be rendered. This rendering generates an entire computer display image, one scanline at a time.

FIG. 4 illustrates one prior art system for rendering objects on a display. Memory 410 stores the objects used to make the computer display image. This means that the objects in the object activation list are stored in the memory 410. These objects are communicated to an object access control 420 over memory bus 411. Object access control 420, and rendering circuit 430, perform steps 202–205. The object access control 420 maintains the active object list as each scanline is rendered. The object access control 420 also passes the objects in the active object list to rendering circuit 430. The object information is passed via the object bus 421. Rendering circuit 430 generates a scanline from the objects in each received active object list. Each generated scanline is passed to frame buffer 440 via rendered scanline bus 441. Display 450 displays the pixels stored in the frame buffer 440 to produce the computer display image.

To reduce the cost of the prior art system, memory 410 is typically Dynamic Random Access Memory (DRAM). One problem with this system is that DRAM has a relatively slow access time. The active list, passed to the rendering circuit, contains the information for all the objects in that list. For each scanline, the object access control 420 must access memory 410 for each object in the corresponding active object list. Therefore, the speed of these accesses to memory 410 are a limiting factor in prior art systems.

In a typical prior art system, each object, in the active list, requires approximately 100 bytes of memory. However, desirable quality computer graphics display can be achieved if 10 Mbytes/s of information transfer is sustained between object control access 420 and rendering circuit 430. This means that 10 Mbytes/s of active list objects is transferred to the rendering circuit 430. In this system, a similar information transfer rate between memory 410 and object access control 420, need be maintained, or a bottleneck occurs. That is, if memory 410 cannot supply 10 Mbytes/s to object access control 420, then the object access control 420 cannot maintain a supply of 10 Mbytes/s to the rendering circuit. Therefore, in prior art systems, either higher cost components are used in memory 410, DRAM would not likely suffice, or the quality of the computer graphics is reduced. Neither of these solutions are particularly desirable. Therefore, what is needed is a system that provides low cost, quality computer graphics display. Further, what is needed is a scanline rendering system where the object memory access time does not act as a bottleneck to the rendering of objects. Also, what is desired is to be able to supply a scanline rendering circuit a large number of active objects while still using relatively low cost, but slow access, DRAM memory components to store the objects making up the computer display image.

An improved apparatus and method for rendering objects is needed.

SUMMARY OF THE INVENTION

An improved method and apparatus for rendering objects is described. One embodiment of the present invention allows objects to be stored in a fast memory to provide improved system performance while maintaining a low cost system. An active list of objects is generated. The list includes a first subset of objects that are stored in a first memory. The first subset of objects are accessed and are stored in a second memory, where the second memory has a faster access time than the first memory. The list is then provided to the rendering circuit. Note that because some of the objects are stored in the fast memory, if those objects are needed again, access to those objects will require much less time.

In another embodiment, the list includes a second subset of objects. The second memory includes the second subset of objects. The first subset of objects and the second subset of objects are provided to the rendering circuit. Note that the second subset of objects are provided from the faster second memory, providing better system performance.

In another embodiment, a second active list is generated. Objects included in the first active list, but not in the second active list are marked as no longer being used. This frees up storage in the second memory, for use by other objects.

In another embodiment, the first active list is generated, and the first subset of objects is accessed, while a next scanline is being rendered. This allows objects to be stored before they are needed. In another embodiment, the active list is provided while objects are being rendered in a present scanline.

In another embodiment, the address of each object is changed when it is stored in the second memory. To determine whether an object is stored in the second memory, an address comparison is performed.

In another embodiment, main memory is utilized to contain portions of the active list that cannot be stored in the cache memory. Each object includes a plurality of pointers, one for each active list controller in order to identify the objects in the active list which are maintained in the main memory.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DETAILED DESCRIPTION OF THE INVENTION

An improved apparatus and method for rendering objects is described. In the following description, numerous specific details are set forth, such as activation lists, cache control methods, etc., in order to provide a thorough understanding of the present invention. It will be obvious, however, to one skilled in the art, that the present invention may be practiced without these specific details. In other instances, well-known circuits, structures and techniques have not been shown in detail in order not to unnecessarily obscure the present invention.

Figure 4:
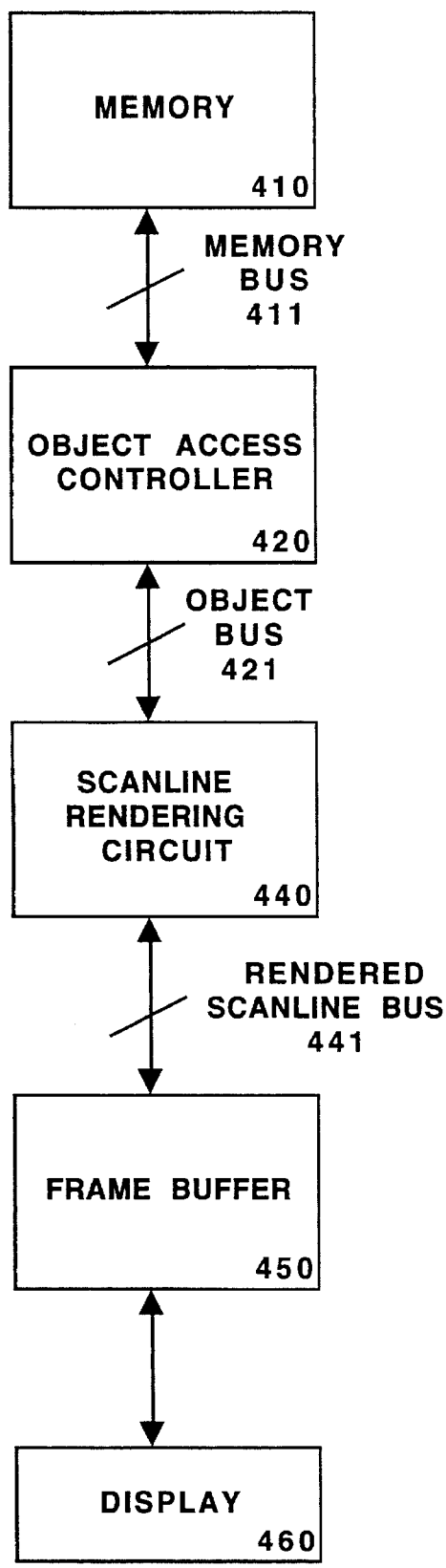
FIG. 4 illustrates a prior art system for the scanline rendering of objects.
Figure 5:
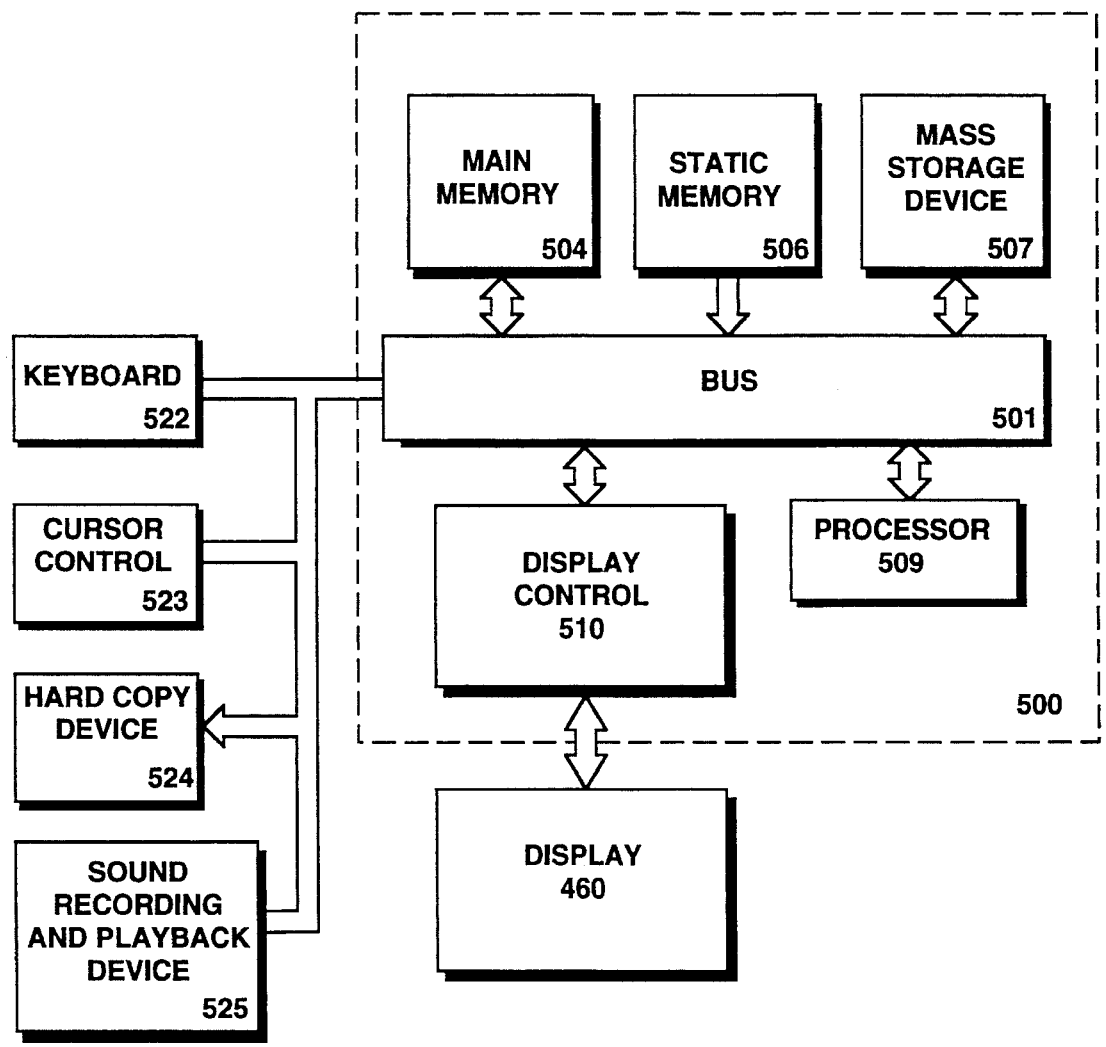
FIG. 5 illustrates a computer system in which the present invention may be implemented.

Referring to FIG. 5, the computer system upon which an embodiment of the present invention can be implemented is shown as 500. Computer system 500 comprises a bus 501, or other communications hardware and software, for communicating information, and a processor 509 coupled with bus 501 for processing information. System 500 further comprises a random access memory (RAM) or other dynamic storage device 504 (referred to as main memory), coupled to bus 501 for storing information and instructions to be executed by processor 509. Main memory 504 also may be used for storing temporary variables or other intermediate information during execution of instructions by processor 509. In one embodiment, main memory 504 is used to store portions of the active list which do not fit into the cache memory of an active list controller. Computer system 500 also comprises a read only memory (ROM) 506, and/or other static storage device, coupled to bus 501 for storing static information and instructions for processor 509. Data storage device 507 is coupled to bus 501 for storing information and instructions. Data storage device 507 can be a magnetic disk or optical disk, and its corresponding disk drive, or any other storage medium. Memory 410, of FIG. 4, could include any, or all, of these types of memory/data storage devices. However, typically, memory 410 only includes the main memory 504.

Computer system 500 can also be coupled via bus 501 to display control 510. Display control 510 generates the necessary signal for display device 460 to display information to a computer user. Display control 510 can include a frame buffer, and specialized graphics rendering devices. Display 460 can include a cathode ray tube (CRT), and/or a flat panel display, or any other display device.

An alphanumeric input device 522, including alphanumeric and other keys, is typically coupled to bus 501 for communicating information and command selections to processor 509. Another type of user input device is cursor control 523, such as a mouse, a trackball, a pen, a touch screen, or cursor direction keys for communicating direction information and command selections to processor 509, and for controlling cursor movement on display 460. This input device typically has two degrees of freedom in two axes, a first axis (e.g.,x) and a second axis (e.g.,y), which allows the device to specify positions in a plane. However, this invention should not be limited to input devices with only two degrees of freedom.

Another device which may be coupled to bus 501 is a hard copy device 524 which may be used for printing instructions, data, or other information on a medium such as paper, film, or similar types of media. Additionally, computer system 500 can be coupled to a device for sound recording, and/or playback 525, such as an audio digitizer coupled to a microphone for recording information. Further, the device may include a speaker which is coupled to a digital to analog (D/A) converter for playing back the digitized sounds. Finally, computer system 500 can be a terminal in a computer network (e.g.,a LAN).

A SYSTEM FOR CACHING OBJECTS TO BE RENDERED

As noted previously, what is needed is a system that provides low cost, quality computer graphics display. The present invention provides one solution to this problem. One embodiment allows a rendering circuit to render the objects in the active object list, without having significant impact from a slow object memory. It has been discovered that with little additional cost, the negative impact on performance of a DRAM's slow access time can be overcome.

Figure 6:
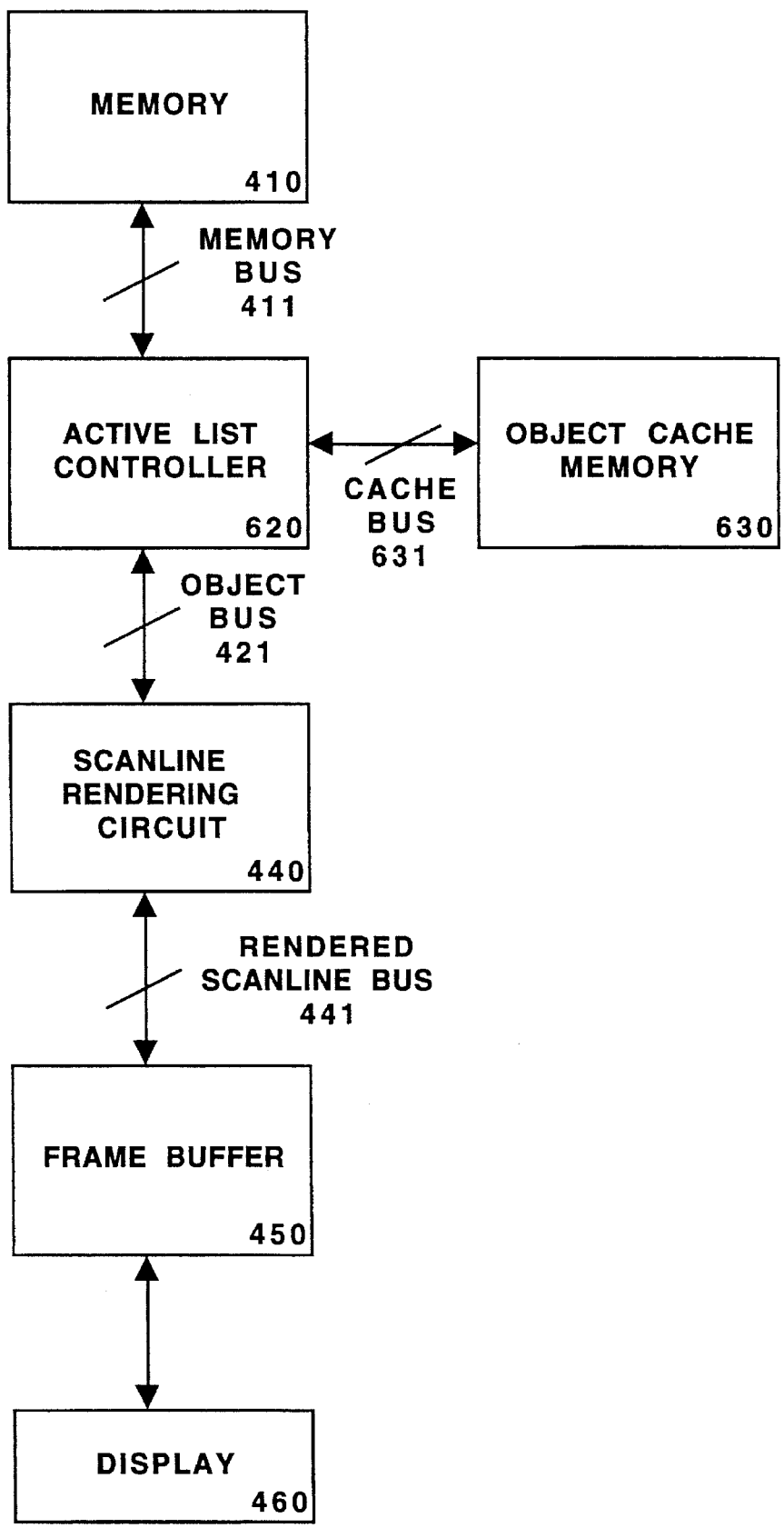
FIG. 6 illustrates a system for caching objects to be rendered.

FIG. 6 illustrates a general overview of one embodiment of the present invention. Memory 410 is coupled to active list controller 620. Object cache memory 630 is also coupled to the active list controller 620 via cache bus 631. The active list controller 620 provides the objects in an active list to the scanline rendering circuit 440, via object bus 421. It has been discovered that caching objects in the active list reduces the negative effects of slow access to memory 410. That is, by temporarily storing the objects, of the active objects list, in a much faster memory, a much higher communication rate of objects to the scanline rendering circuit can be sustained.

As mentioned previously, memory 410 can include any of a number of storage devices/media, all being able to store mass amounts of information at a relatively low cost. This means that hundreds, or thousands, of objects can be stored in memory 410. Further, memory 410 can store application programs for manipulating the objects, and for performing other system operations.

Figure 1A:
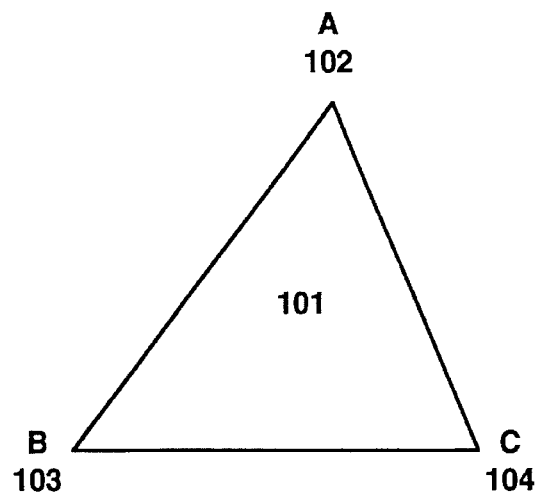
FIG. 1a illustrates an object that can be displayed on a computer display.
Figure 1B:
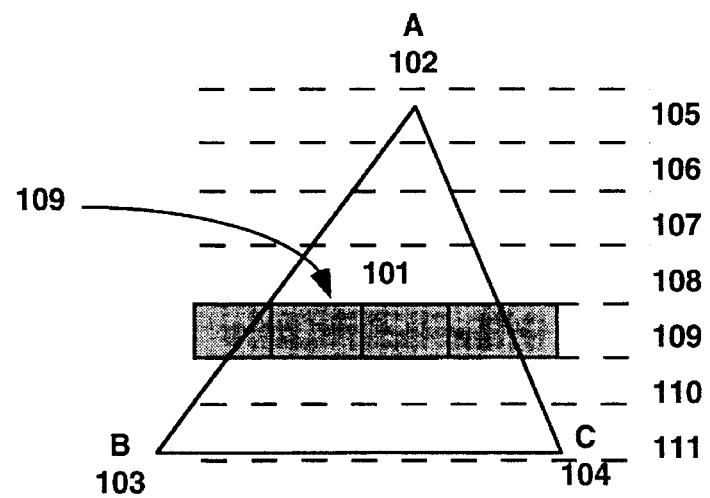
FIG. 1b illustrates the object of FIG. 1a mapped for display.
Figure 2:
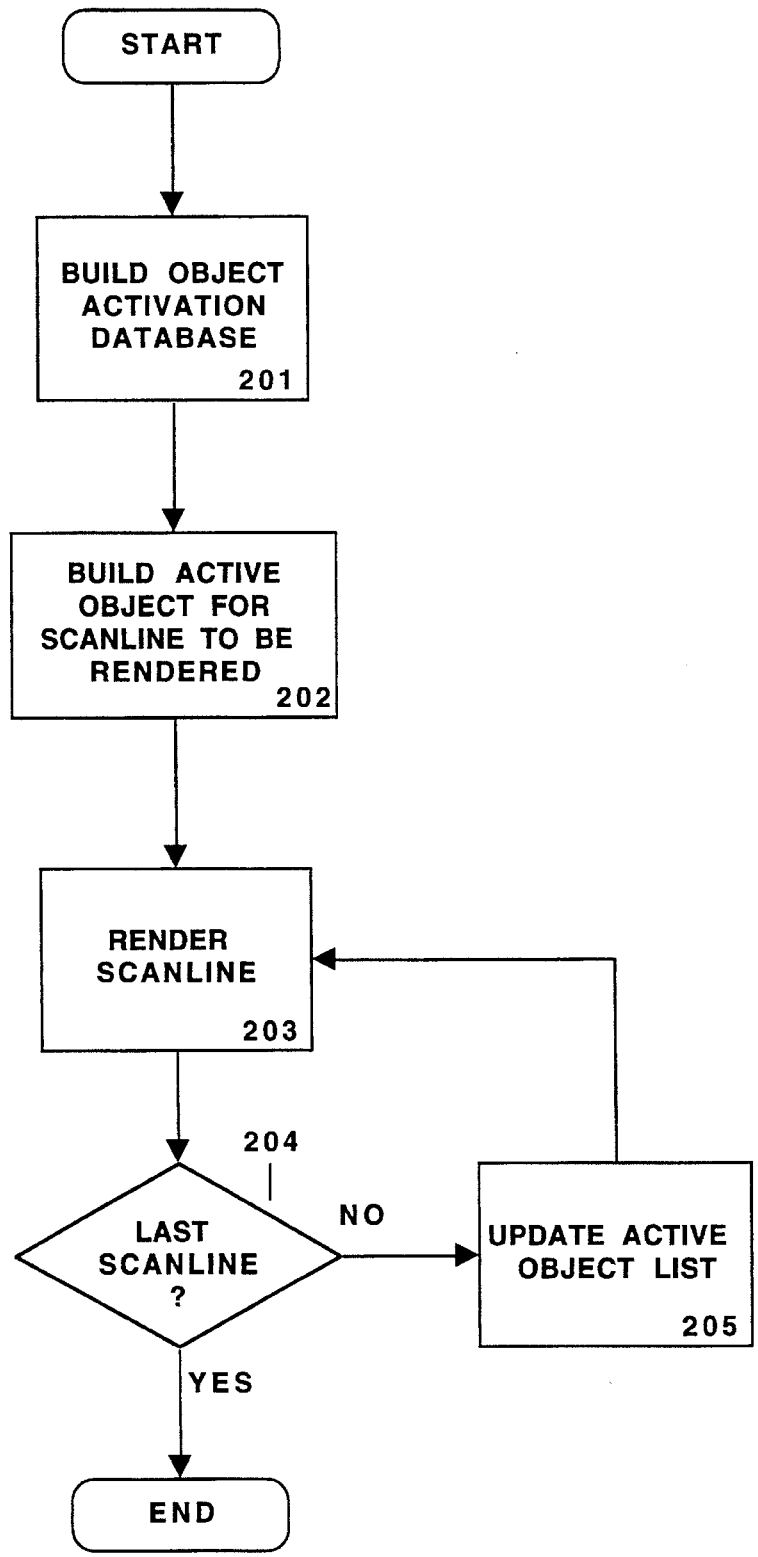
FIG. 2 is a flowchart illustrating a scanline method for rendering an image.
Figure 3A:
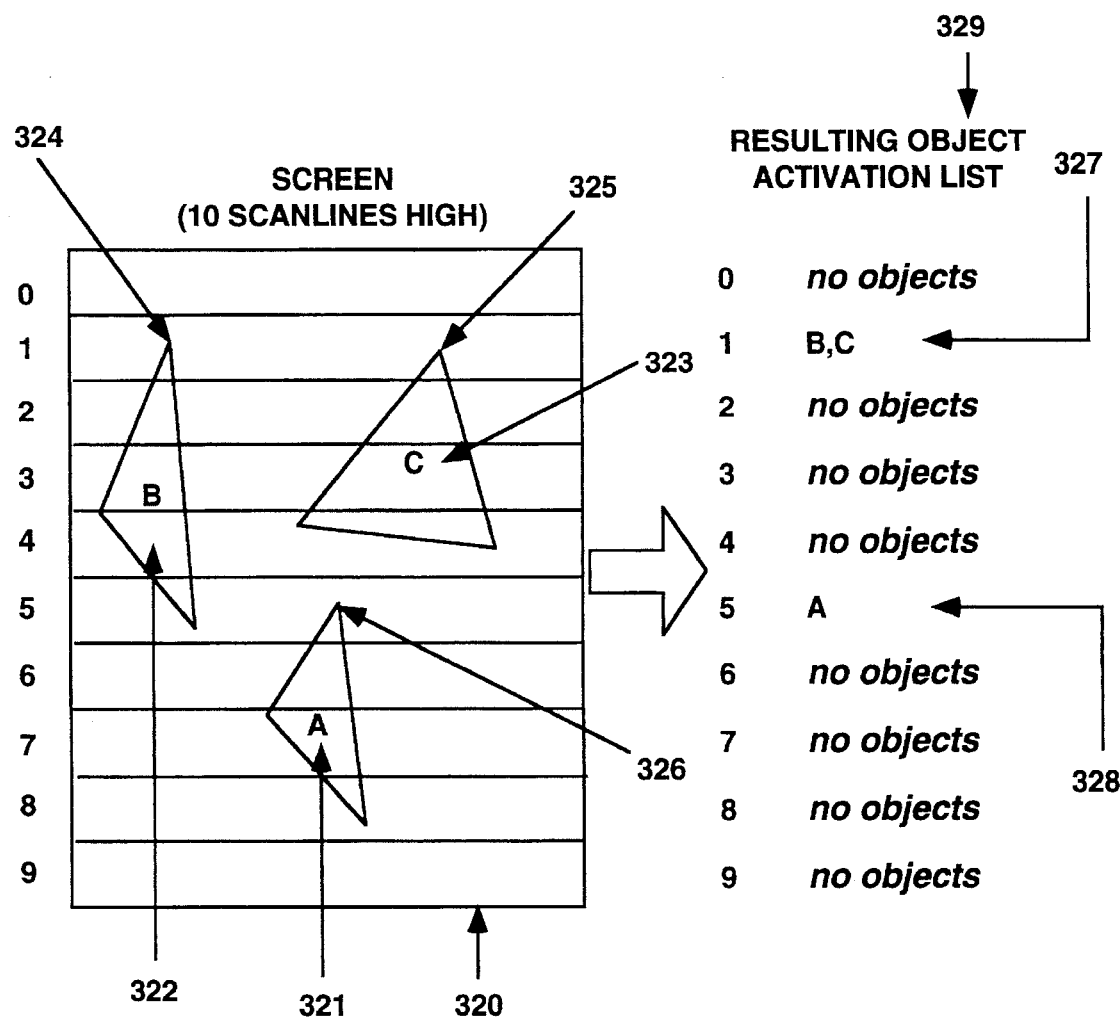
FIG. 3a illustrates an object activation list as used in the scanline method.
Figure 3B:
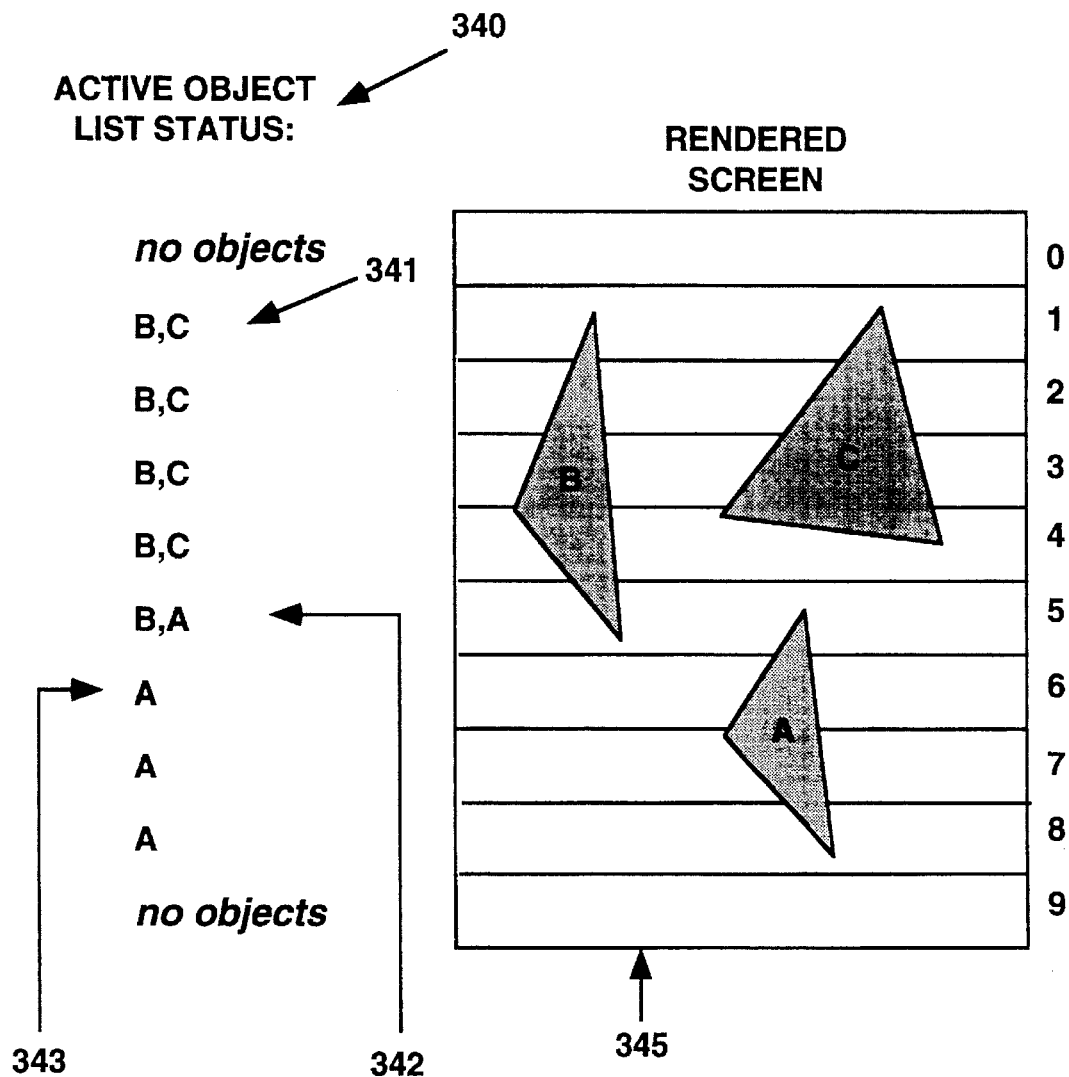
FIG. 3b illustrates the active object list status for each scanline rendered from the FIG. 3a example.

The following illustrates the operation of active list controller 620 and object cache 630. Assume that the objects of FIG. 3b are to be cached. To render scanline 0, the active list controller 620 need not provide any objects to scanline rendering circuit 440. Scanline rendering circuit 440 will produce scanline 0, with no portions of any objects represented, and pass this to frame buffer 450.

Next, scanline 1 is processed. The active list controller 620 adds objects B 322 and C 323 to it's active object list. As these objects are not cached in object cache memory 630, these objects are then requested from memory 410. When memory 410 provides objects B 322 and C 323, active list controller 620 provides B 322 and C 323 to the scanline rendering circuit 440. Note that until this point, this embodiment operates similarly to the prior art of FIG. 4. However the present embodiment now differs in that the active list controller 620 also stores B 322 and C 323 in object cache memory 630. The advantage of this will be seen in the rendering of the next scanline.

Scanline 2 is then processed. The active list controller 620 does not change the active object list because both B 322 and C 323 remain active for this scanline. The active list controller 620 then checks to determine whether the objects in the active object list have been cached. In this case, object cache memory 630 has B 322 and C 323 stored. The active list controller 620 retrieves B 322 and C 323 from object cache memory 630. Remember that object cache memory 630 is relatively small, but much faster than memory 410. Thus, for scanline 2, the active list controller 620 can provide B 322 and C 323 to scanline rendering circuit 440 in much less time than was required for scanline 1. For scanlines 3 and 4, the same steps are followed and B 322 and C 323 are provided in the much shorter time.

Scanline 5 is then processed. The active list controller 620 updates the active object list to that shown at 342. Active list controller 620 requests A 321 from memory 410. While memory 410 is processing the request, active list controller 620 can request B 322 and C 323 from object cache memory 630. In one embodiment of the present invention, B 322 and C 323 can be provided to scanline rendering circuit 440 while memory 410 is processing the request for A 321. In another embodiment of the present invention, active list controller 620 communicates the objects in the active object list in the same order as the objects appear in the list. In any case, the objects of active object list, at stage 342, can be provided to the scanline rendering circuit 440 in less time than the prior art system of FIG. 4. This is because only one object need be requested from slow memory 410. As with objects B 322 and C 323, the first time they are received from memory 410, they are stored in object cache memory 630.

Scanline 6 is then processed. Active list controller 620 updates the active list to the state shown at 343. The active list controller 620 determines that object cache memory 630 contains A 321, and accesses object cache memory 630. Again, because object cache memory 630 is accessed, rather than memory 410, active list controller 620 can communicate A 321 to scanline rendering circuit 440 in less time than is required by the prior art system. The remaining scanlines can then be rendered without having to access memory 410.

Note that when object cache memory 630 is full, any of a number of well known cache invalidation techniques can be used. These cache invalidation techniques free storage in the cache for use by other data. For example, the least recently used object in the cache can be replaced by an object received from memory 401, or a random object in object cache memory 630 can be replaced by an incoming object. However, as is discussed later, it has been discovered that a particular cache replacement system provides significant cache hit improvements. A cache hit occurs when a revised object is stored in the cache. This improved cache hit rate improves the performance of the system. In addition, in an alternative embodiment, when object cache memory 630 is full, the active list is continued from the cache into main memory such that cache invalidation does not need to be performed to free up cache memory.

Thus, the FIG. 6 system can provide improved graphics display performance by reducing the number of accesses to memory 410 and thereby increase the number of objects that the system is capable of rendering. In one embodiment of the present invention, it has been discovered that using relatively small, fast memory components, in object cache memory 630, greatly improves the performance of the graphics display system.

In one embodiment of the present invention, memory 410 includes 16 Mbit, 80 ns DRAM. Object cache memory 630 is comprised of synchronous 32 Kbit×36, 12 ns SRAM (Micron MT 58LC32K26M1). The active list controller 620 includes special circuitry for controlling the caching of objects in the active object list to object cache memory 630. By caching the active object list, active list controller 620 can quickly access the objects most likely to be required by the scanline rendering circuit 440.

As is described further in this document, other inventive aspects of the implementation of the active list controller 620 and object cache memory 630, further increase the performance of the present embodiment.

Figure 7:
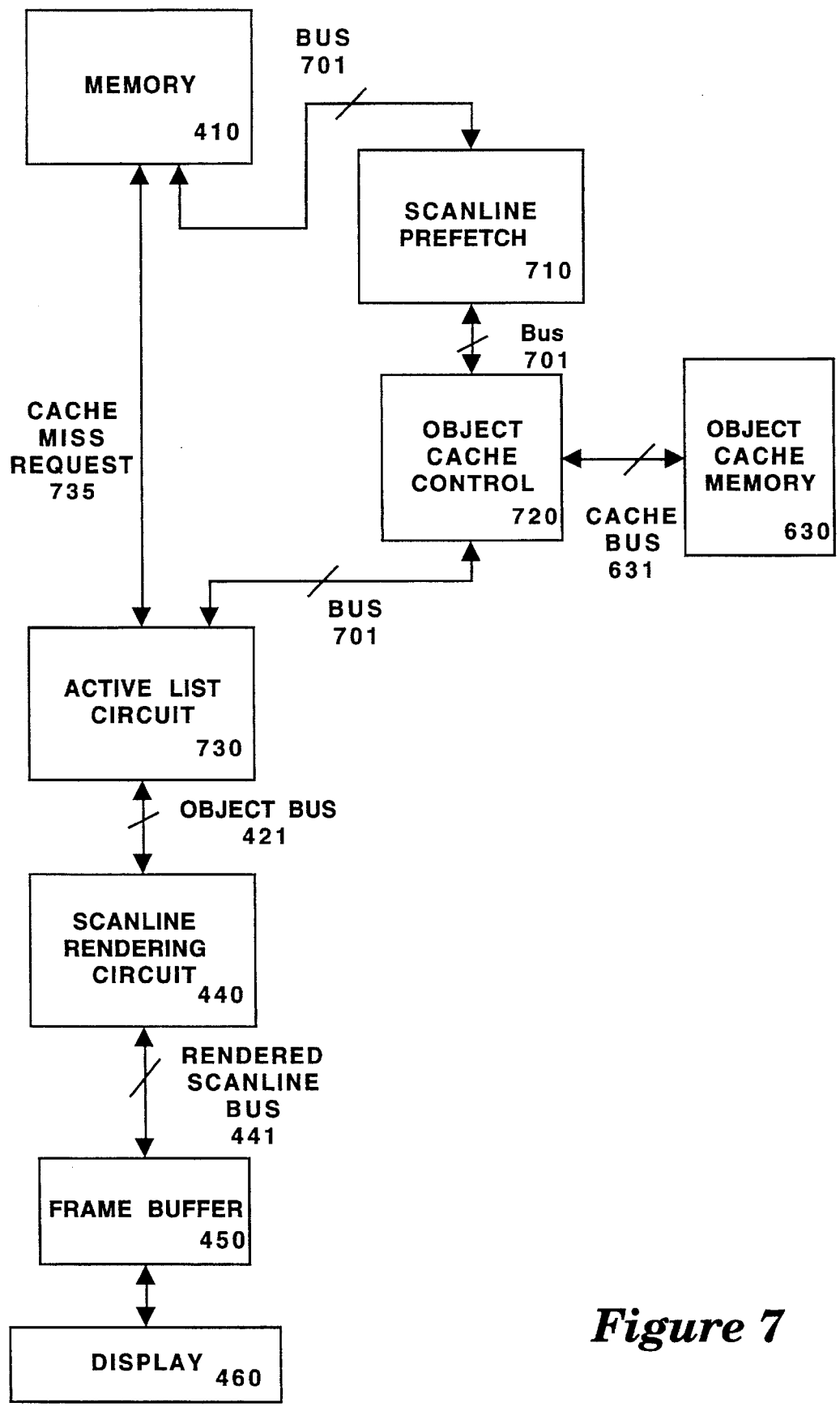
FIG. 7 illustrates another embodiment of a system caching objects to be rendered.

FIG. 7 illustrates a view of another embodiment of the present invention. This embodiment prefetches objects one scanline before they are needed. This reduces the chance of an interruption of the rendering process, when an object is first accessed. This embodiment has further performance improvements over an embodiment that merely caches the active object list objects. For example, if scanline rendering circuit 440 is rendering scanline 4, then scanline prefetch 710 requests objects in scanline 5. This process is described in greater detail in relation to FIG. 8. By prefetching objects before they are needed, more objects can be rendered per scanline, improving the image displayed on display 460.

In this embodiment, the active list controller 620 has been replaced by a scanline prefetch 710, an object cache control 720, and an active list circuit 730. The scanline prefetch 710 is coupled to memory 410 via bus 701. The object cache control 720 is coupled to the scanline prefetch 710 via bus 701. The object cache control 720 is also coupled to object cache memory 630 via cache bus 631. Active list circuit 730 couples to the object cache control 720 via bus 701.

Scanline prefetch 710 maintains an active object list for the next scanline to be rendered. Scanline prefetch 710 also requests, via bus 701, objects contained in the active object list for the next scanline to be rendered.

Object cache control 720 is for controlling access to object cache memory 630. Object cache control 720 is also for storing an object received over bus 701 from memory 410 into object cache memory 630. Of course, object cache control 720 will only store a received object if there is room in object cache memory 630.

Active list circuit 730 is for maintaining the active object list for the present scanline. The active list circuit 730 provides the objects in the active list to scanline rendering circuit 440, for rendering of the present scanline. Active list circuit 730 requests the objects in the present active object list from object cache control 720. If an object is not stored in object cache memory 630, then active list circuit 730 requests the object from memory 410 via cache miss request 735. An object may not be in cache memory because, there are too many objects in the present scanline for them all to be stored in object cache memory, or because memory 410 could not provide all the prefetched objects in time.

In this system, each object is referenced by a particular address. In one embodiment of the present invention, traditional tags are used to reference cached data. Typically, cached data is associated with one or more tags. This allows easy indexing of data. However, it has been discovered that improved performance can be gained by not providing additional tags to reference objects stored in object cache memory 630. Thus, in another embodiment, no additional tags are needed in object cache memory 630. This allows more objects to be stored in object cache memory 630. A reference to an object, stored in object cache memory 630, is maintained by changing the address of that object as it is stored in object cache memory 630. The address of the object is changed such that each cached object will have an address not found in memory 410. This makes the test to determine whether a particular object is in the cache (called a cache hit test) a simple address comparison. Thus, to test if an object in the present scanline's active object list, active list circuit 730 need only test if that object's address is within a certain range.

Figure 8:
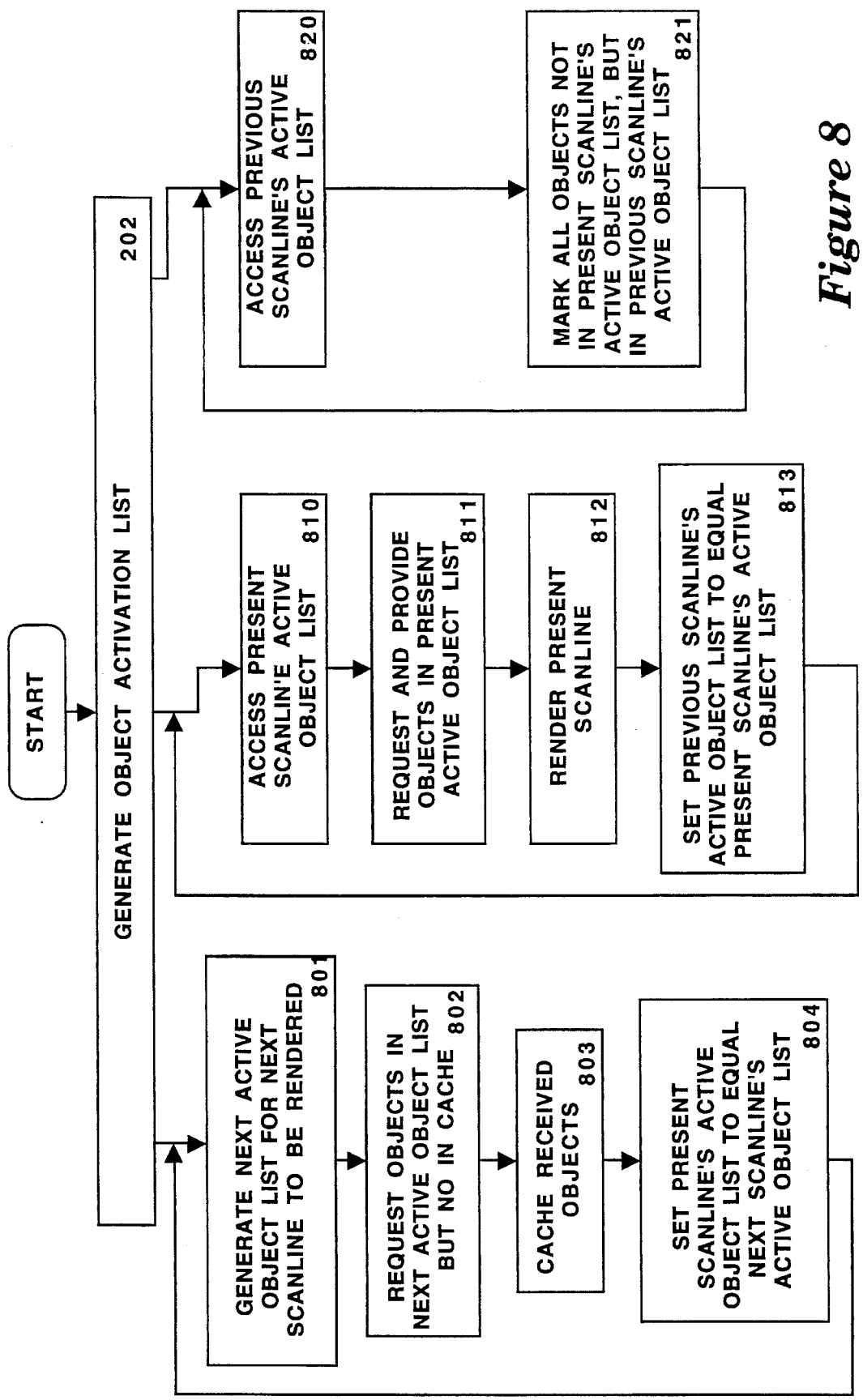
FIG. 8 is a flowchart illustrating a method of caching objects to be rendered.

FIG. 8 illustrates further advantages of the present invention. FIG. 8 illustrates a method of caching objects to be rendered. This method can be used in the embodiment of FIG. 7. As is discussed below, this method has the following advantages:

- objects are moved from the slow memory to fast cache memory one scanline before they are required by the rendering circuits, this decouples the longer access time of slow memory from the rendering task;
- a cached object is kept in the cache until all rendering references to have completed, thus, any modifications made to the object during the rendering procedure are made while the object is in the fast cache memory, rather than the slow memory, and
- objects are retained in the cache for exactly as long as they are active, therefore, the cache invalidation method provides more efficient cache use than other heuristics.

Like the prior art method, at step 202, the object activation list is generated for the image. However, the remaining steps differ considerably from the prior art, and provide the previously mentioned advantages. Steps 801–804 prefetch the objects in the next scanline's active object list. Steps 810–813 access the cache memory 630 to provide the scanline rendering circuit 440 the objects in the present scanline's active object list. Steps 820–821 mark objects in object cache memory 630 as being no longer needed, thereby freeing cache storage for other objects. Typically, the marked objects are not written back to memory 410. The marked objects are simply overwritten with new object information. This is because, once rendered, objects are usually discarded. The above groups of steps can run in parallel. One skilled in the art would understand how these steps can be run in parallel; therefore, to simplify the description of this embodiment, some details of the parallel operation have not been included.

Similarly, some detail regarding initialization and final completion steps of the method have not been included. One skilled in the art would understand how to implement these steps, given the description herein.

Beginning with the prefetching steps, step 801 generates the active object list for the next scan. For example, if scanline 4 were being rendered by scanline rendering circuit 440, at step 801, the active object list for scanline 5 would be generated. Next, at step 802, the objects in the next active object list, but not already in object cache memory 630, are requested. In one embodiment, scanline prefetch 710 performs steps 801 and 802. While performing step 802, scanline prefetch 710 determines whether each object in the next scanline's active object list is already stored in object memory cache 630 (in one embodiment, this test is done using a simple address comparison). For example, if prefetch circuit 710 is prefetching objects for scanline 5, then only object A 321 would be requested from memory 410, as objects B 322 and C 323 would already have been cached.

At step 803, objects received from memory 410 are stored in object cache memory 630. As mentioned previously, in one embodiment, object cache control 720 stores all objects, received from memory 410, in object cache memory 630. Of course, the object cache control 720 only stores these received objects if there is room in object cache memory 630.

At step 804, the present scanline's active object list is set to the next scanline's active object list. This allows the next scanline to be rendered. For example, if the next active object list for scanline 5 has been prefetched, in steps 801–804, then the present active object list for scanline 4 has been rendered, in steps 810–813. Thus, the steps 810–813 can be performed for scanline 5.

While the prefetching steps are being performed, the present scanline is being rendered. At step 810, the present scanline's active object list is accessed. Next, step 811, all the objects in the present active object list are requested and then provided to the rendering device. In one embodiment, active list circuit 730 determines whether an object in the present scanline's active object list is in object cache memory 630. If the object is in the cache, then that object is accessed and provided to scanline rendering circuit 440. Note that because the prefetching steps had already prefetched the objects for the present scanline, only rarely will some of the objects not be in the cache. This allows the rendering of the present scanline to proceed without having to wait for slow memory 410 accesses. At step 812, the present scanline is rendered. Note that some of the present scanline can be rendered, step 812, while objects are being accessed, and provided, in step 811.

Another advantage of the present invention is illustrated where step 812 involves modifying an object. During rendering, an object may be modified, for example, to change it's associated linked list information. If the object were in slow memory, not only would the scanline rendering have to wait for an initial read from the memory, but any modifications to an object would require waiting for a write to the slow memory. In one embodiment, modifications to an object can be done by writing to the fast cache memory.

At step 813, the previous scanline's active object list is set to equal the present scanline's active object list. This allows objects no longer needed, to be marked as being no longer needed, thereby freeing up space in the cache memory.

At step 820, the previous scanline's active object list is accessed. Next, all the objects not needed to render future scanlines, are marked as being no longer needed. It has been discovered that these cache invalidation steps are more efficient than other cache invalidation schemes. Objects are retained in the cache for exactly as long as they are needed. For example, if the previous scanline is 5, i.e. scanline 6 is presently being rendered, then B 322 will be have been completely render. Therefore, B 322 will no longer be needed, and the room in the cache can be freed for other objects.

Another advantage of the use of steps 820–821 occurs when the present scanline incurs a cache miss. In the rare circumstances of a cache miss, slow memory must be accessed to obtain the required object. However, because slow memory is being accessed, some objects may be marked as no longer needed, in step 821. Therefore, when slow memory returns the needed object, there may be room in the cache to store that object.

Thus, it has been shown that steps 801–804, 810–813, and 820–821, can efficiently render objects in a system having relatively slow memory. Further, a number of discoveries have lead to performance improvements in the scanline rendering of graphical images.

Figure 9:
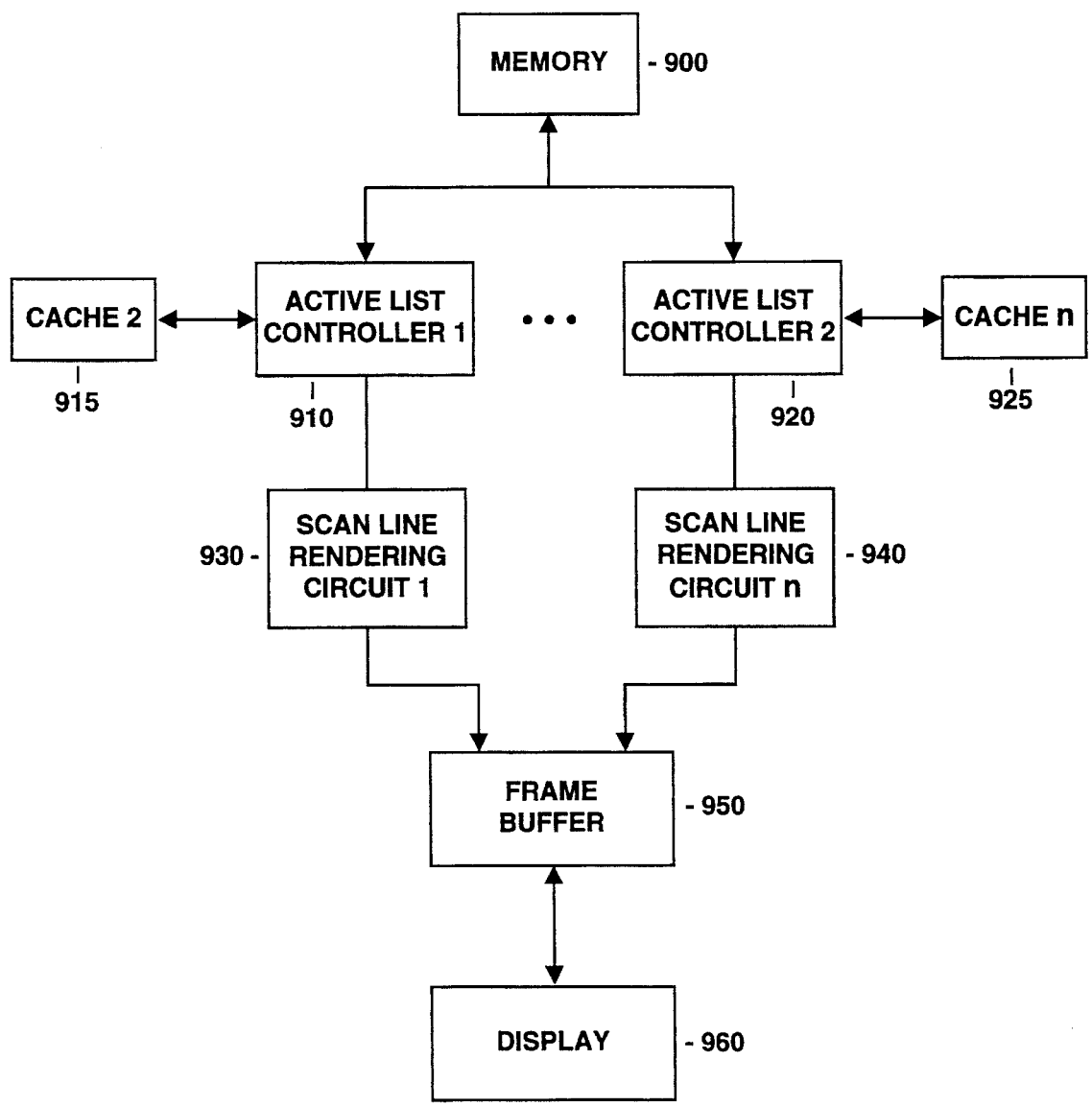
FIG. 9 illustrates an alternate embodiment in which multiple scanline circuits are used to render and main memory is used to store portions of the active object lists when the cache associated with a particular scan line circuit is full.

This system is scalable to include multiple scanline rendering circuits. This is illustrated by FIG. 9 in which main memory 900 is coupled to a multiplicity of active list controller and scanline rendering circuits, in this example, active list controller 1,910 and active list controller 2, 920. Each active list controller has a cache 915, 925 and are coupled to individual scanline rendering circuits 930 and 940. By providing multiple scanline rendering circuits 930, 940, multiple scanlines can be rendered concurrently and output to the frame buffer 950 and subsequently to the display 960.

As described earlier, the active list controller controls the active object list for the particular scanline rendering circuit. The active object list is stored in the cache 915, 925. The list is modified as objects are added and removed from the active object list. An object list database of all objects is maintained in main memory 900. When an object is added to the active object list for a particular scanline rendering circuit, the active list controller copies the object from the memory 900 into the cache 915 and links the object to the active object list by incorporating the object into the linked list architecture used. For example, the linked list architecture includes a plurality of active objects, each object including the object data and a pointer to the next active object in the linked list. Thus, when an active object is added, the linked list is updated to include the object and similarly, when an object is no longer active on the scanline, the active list controller 910 removes the object by modification of the appropriate pointers of the linked list.

Figure 10A:
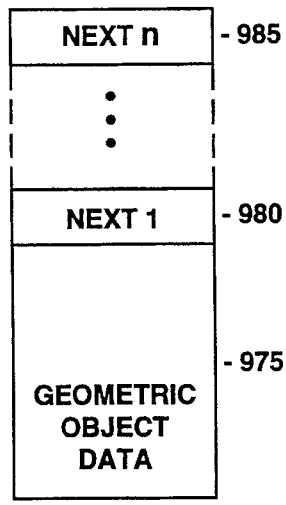
FIG. 10a is illustrative of the active object list data structure stored in main memory and FIG. 10b illustrates the use of pointers to maintain portions of the active object list in main memory for two scanline rendering devices.

However, it is possible that the size of the active object list will exceed the capacity of the cache 915. If this occurs, items may be removed from the cache 915 in order to make room for the additional objects Alternatively, main memory 900 is used to store those objects that cannot be stored in the cache 915. The object data structure stored in main memory 900 includes a next pointer for each scanline rendering circuit of the system. This is illustrated in FIG. 10a in which active object data 975 includes next pointer 1 980 for scanline rendering circuit 1 (930, FIG. 9) and next n pointer 985 for scanline rendering circuit 940 (FIG. 9). Preferably, the active list controller 910, 920 is modified to handle the situation when the cache 915, 920 is full and updates the pointer of the last active object of the linked list located in the cache to point to tile location in memory of the first active object of the linked list that is contained solely in main memory 900. The next active object would then be pointed to by the next pointer, for example, next 1 980, associated with the object data 975. As multiple pointers 980, 985 are associated with the single copy of the object data 975, main memory is not cluttered with multiple copies of the object data.

Figure 10B:
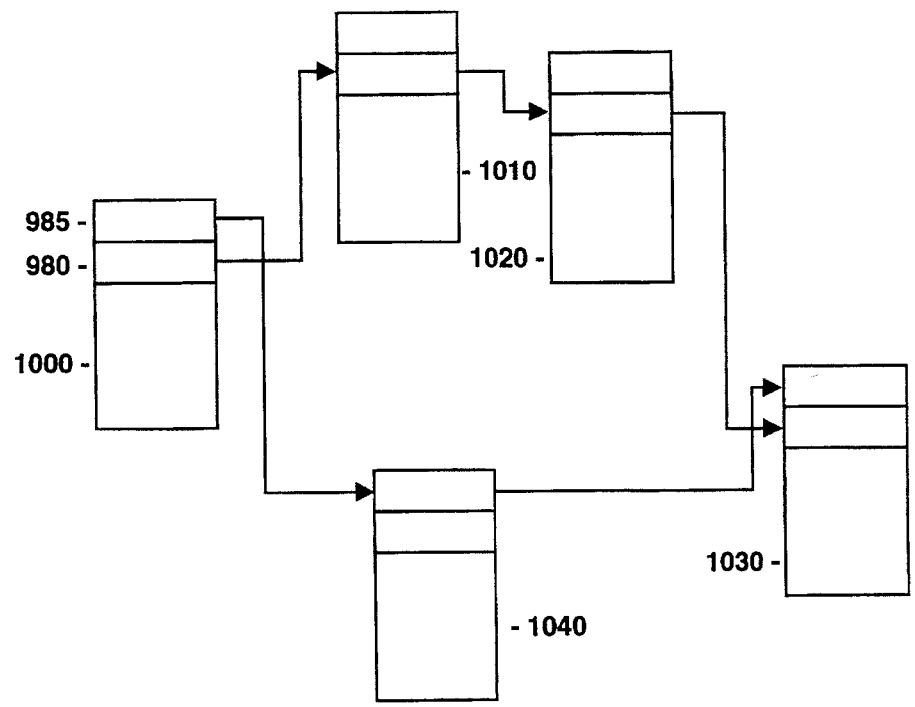

Furthermore, the active list controller 910, 920 can modify the linked list of the active objects, including that portion of the list located in main memory 900, independently of other active list controllers operating concurrently. This is possible by the multiple pointers 980, 985 provided. Therefore, by using this technique and structure, the rendering process can be incrementally accelerated by running multiple scanline rendering devices in parallel. This is illustrated in FIG. 10b. FIG. 10b shows two linked lists for two scanline rendering devices. The first linked list is identified by pointer 985 and includes objects 1000, 1010, 1020, and 1030. The second linked list includes objects 1000, 1040 and 1030. In addition, utilizing a single set of control information and geometric information at the main memory reduces the amount of overhead in rendering the image. The resulting reduction in overhead increases the efficiency and thus further reduces the amount of time required to render an image.

As the cache empties (as active objects are removed from the active object list), the cache and the main memory can be updated simply by modifying the pointers in main memory to reflect that certain objects are stored currently in the cache. Thus, an object not contained in the active object list, or an object that is active but located in the cache will include a null entry to indicate that it is not part of an active list located on main memory for a particular rendering device.

It is apparent to one skilled in the art that this embodiment may be used in conjunction with the prior embodiments described to provide a more efficient mechanism for rendering geometric data on a display device.

An improved apparatus and method for rendering objects has been described.

What is claimed is:

1. A system for displaying objects on a display, said system comprising:

a first memory for storing a first set of the objects, each object having at least one next pointer, which when set to an object list value, points to a next object in a linked list of at least a portion of a group of objects active on the display;

a second memory for storing a second set of the objects, said second memory having a faster access time than said first memory, said second set part of the group of objects active on the display;

at least one scan line rendering device, said scan line rendering device generating graphic data of the group of objects active on a scan line, said graphic data utilized to display the objects, said scan line rendering device further copying objects from the first memory to the second memory as objects become active and removing objects from the second memory when an object is no longer active, said scan line rendering device further maintaining a list of a portion of the group of active objects in the first memory when the second memory is full by providing a pointer to the first object in the first set of objects that is on the active list but not stored in the second memory and updating the next pointer of the object to an object list value that points to a next object on the active list not stored in the second memory to provide a linked list of objects in the first memory on the active object list.

2. The system as set forth in claim 1, wherein the at least one scan line rendering device comprises multiple scan line rendering devices, each of said scan line rendering devices rendering a different set of scan lines of the display, each object of said first memory comprising multiple next pointers, each next pointer associated with a different rendering device such that multiple linked lists of active objects are maintained using the first set of objects.

3. The system as set forth in claim 1, wherein when an object of the first set of objects is not on the active object list, the next pointer is set to a null value.

4. The system as set forth in claim 1, wherein the objects comprise triangles.

5. The system as set forth in claim 1, wherein the scan line rendering device comprises an object access controller for maintaining the group of active object in the first memory and second memory and a rendering circuit which reads the active objects of the group of active objects and generates the graphic data.

6. In a computer system comprising a processor, a first memory, at least one second memory faster than the first memory, a display device and at least one rendering device for rendering active objects on the display device, coupled via at least one bus, a method for providing active objects to the rendering circuit comprising the steps of:

storing a first set of objects on the first memory, each of said objects comprising at least one next pointer, which when set to an object list value, points to a next active object in a linked list of objects active on the display;

when an object is identified to be active, copying the active object on the first memory to the second memory to become part of an active object list;

if the second memory is full when an object is identified to be active, providing an active object list pointer from the second memory to the active object located in the first set of objects on the first memory to continue the active object list in the first memory, and setting the next pointer of the active object to point to the location in the first memory of a next active object located in the first set of objects on the first memory, such that a portion of the active object list comprises a linked list of active objects not stored in the second memory;

said rendering device accessing the active object list from the second memory, and when the second memory is full, said rendering device further accessing the portion of the active object list located in the first memory and identified by the linked list of active objects in the first memory.

7. The method as set forth in claim 6, further comprising the step of removing objects from the active object list comprising the steps of:

if the object to be removed is located in the second memory, deleting the object from the second memory; and if the object to be removed is located in the first memory, modifying the next pointer of the prior object that points to the object to be removed such that the next pointer of the prior object points to the next object subsequent to the object to be removed, such that the object is removed from the linked list of active objects.

8. The method as set forth in claim 7, wherein if the object to be removed is located in the first memory, set method further comprising setting the next pointer of the object to be removed to a null value.

9. The method as set forth in claim 7, wherein if an object is removed from the second memory and the second memory is no longer full, copying an active object from the first memory to the second memory.

10. The method a set forth in claim 6, further comprising the step of initializing the next pointers to null values.

11. The method as set forth in claim 6, wherein the at least one rendering device comprises multiple rendering devices for concurrently rendering multiple scan lines and the at least one second memory comprises multiple second memories, each one of said second memories associated with one of the rendering devices, said objects stored on the first memory comprising multiple next pointers, one of said next pointers associated with one of the second memories, such that when one of the second memories is full, a linked list of active objects associated with the full second memory is located on the first memory using the next pointers associated with the full second memory;

wherein multiple linked lists are created when multiple second memories are full by setting the associated next pointers.

12. A system for displaying objects on a display, said system comprising:

a first memory for storing a first set of the objects, each object having at least one next pointer, which when set to an object list value, points to a next object in a linked list of at least a portion of a group of objects active on the display;

a second memory for storing a second set of the objects, said second memory having a faster access time than said first memory, said second set part of the group of objects active on the display;

at least one scan line rendering device,vsaid scan line rendering device generating graphic data of the group of objects active on a scan line, said graphic data utilized to display the objects, said scan line rendering device further copying objects from the first memory to the second memory as objects become active and removing objects from the second memory when an object is no longer active, said scan line rendering device further maintaining a list of a portion of the group of active objects in the first memory when the second memory is full.

* * * * *